(12) United States Patent
Vora et al.

(10) Patent No.: US 8,707,155 B2
(45) Date of Patent: *Apr. 22, 2014

(54) STRUCTURED WEB ADVERTISING

(75) Inventors: Sanjay V. Vora, Hillsboro, OR (US); Joseph R. Kluck, Portland, OR (US); William J. Nerenberg, Hillsboro, OR (US); David E. Dent, Portland, OR (US); Paul M. Cohen, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/979,696

(22) Filed: Dec. 28, 2010

(65) Prior Publication Data
US 2012/0095827 A1    Apr. 19, 2012

Related U.S. Application Data

(63) Continuation of application No. 12/650,635, filed on Dec. 31, 2009, now abandoned, which is a continuation of application No. 12/370,816, filed on Feb. 13, 2009, which is a continuation of application No. 09/222,554, filed on Dec. 29, 1998, now Pat. No. 7,493,553.

(51) Int. Cl.
*G06F 17/00*    (2006.01)

(52) U.S. Cl.
USPC .......................................... 715/205; 715/200

(58) Field of Classification Search
USPC ........................................ 715/205, 200, 255
See application file for complete search history.

(56) References Cited

U.S. PATENT DOCUMENTS

| | | | |
|---|---|---|---|
| 5,838,314 A | | 11/1998 | Neel et al. |
| 5,864,823 A | * | 1/1999 | Levitan ...................... 705/14.61 |
| 5,913,215 A | | 6/1999 | Rubinstein et al. |
| 5,920,859 A | | 7/1999 | Li |
| 5,933,822 A | | 8/1999 | Braden-Harder et al. |
| 5,948,061 A | * | 9/1999 | Merriman et al. ............ 709/219 |
| 5,961,603 A | | 10/1999 | Kunkel et al. |
| 5,978,847 A | | 11/1999 | Kisor et al. |
| 5,999,912 A | | 12/1999 | Wodarz et al. |
| 6,006,197 A | | 12/1999 | d'Eon et al. |
| 6,018,733 A | | 1/2000 | Kirsch et al. |
| 6,035,281 A | * | 3/2000 | Crosskey et al. .......... 705/14.69 |

(Continued)

OTHER PUBLICATIONS

Eysenbach et al., Information in Practice, Google 1998, pp. 1946-1502.*

(Continued)

*Primary Examiner* — Cong-Lac Huynh
(74) *Attorney, Agent, or Firm* — Trop, Pruner & Hu, P.C.

(57) ABSTRACT

A system for selecting a candidate advertisement for linking to a web page based on the content of the web page. The content of the web page may be automatically determined and then compared to content of the candidate advertisement to determine which candidate advertisement to select. The system can be used to implement a structured advertising system for the World Wide Web. Web pages are searched and indexed, producing indexed content data. This indexed content data is then ranked according to relevancy. The ranked content data are compared to content data of advertisements and an advertisement is selected. The advertisement is then copied onto (linked to) the Web page. Other embodiments may be described and claimed.

28 Claims, 8 Drawing Sheets

(56) References Cited

U.S. PATENT DOCUMENTS

| | | | |
|---|---|---|---|
| 6,038,598 A * | 3/2000 | Danneels | 709/219 |
| 6,052,514 A | 4/2000 | Gill et al. | |
| 6,067,552 A | 5/2000 | Yu | |
| 6,070,158 A | 5/2000 | Kirsch et al. | |
| 6,073,135 A | 6/2000 | Broder et al. | |
| 6,101,503 A | 8/2000 | Cooper et al. | |
| 6,112,203 A | 8/2000 | Bharat et al. | |
| 6,119,101 A | 9/2000 | Peckover | |
| 6,148,289 A | 11/2000 | Virdy | |
| 6,182,050 B1 | 1/2001 | Ballard | |
| 6,185,553 B1 | 2/2001 | Byrd et al. | |
| 6,195,698 B1 | 2/2001 | Lillibridge et al. | |
| 6,202,087 B1 | 3/2001 | Gadish | |
| 6,216,112 B1 | 4/2001 | Fuller et al. | |
| 6,216,123 B1 | 4/2001 | Robertson et al. | |
| 6,219,788 B1 | 4/2001 | Flavin et al. | |
| 6,237,039 B1 * | 5/2001 | Perlman | 709/237 |
| 6,256,739 B1 | 7/2001 | Skopp et al. | |
| 6,285,985 B1 * | 9/2001 | Horstmann | 705/14.61 |
| 6,285,987 B1 | 9/2001 | Roth et al. | |
| 6,311,185 B1 | 10/2001 | Markowitz et al. | |
| 6,317,782 B1 | 11/2001 | Himmel et al. | |
| 6,353,825 B1 | 3/2002 | Ponte | |
| 6,446,035 B1 | 9/2002 | Grefenstette et al. | |
| 6,486,891 B1 * | 11/2002 | Rice | 715/738 |
| 6,487,538 B1 * | 11/2002 | Gupta et al. | 705/14.66 |
| 6,513,052 B1 | 1/2003 | Binder | |
| 6,539,377 B1 | 3/2003 | Culliss | |
| 6,560,588 B1 | 5/2003 | Minter | |
| 6,560,600 B1 | 5/2003 | Broder | |
| 6,636,247 B1 * | 10/2003 | Hamzy et al. | 715/808 |
| 6,643,696 B2 | 11/2003 | Davis et al. | |
| 6,769,019 B2 | 7/2004 | Ferguson | |
| 6,823,341 B1 | 11/2004 | Dietz | |
| 6,826,594 B1 * | 11/2004 | Pettersen | 709/203 |
| 6,880,123 B1 * | 4/2005 | Landsman et al. | 715/205 |
| 6,895,387 B1 * | 5/2005 | Roberts et al. | 705/14.47 |
| 6,941,338 B1 * | 9/2005 | Madsen | 709/203 |
| 7,039,599 B2 | 5/2006 | Merriman et al. | 705/14.52 |
| 7,120,871 B1 * | 10/2006 | Harrington | 715/205 |
| 7,194,424 B2 * | 3/2007 | Greer et al. | 705/14.66 |
| 7,437,351 B2 | 10/2008 | Page | 1/1 |
| 7,930,206 B2 * | 4/2011 | Koningstein | 705/14.45 |
| 7,949,936 B2 * | 5/2011 | Friedman et al. | 715/205 |
| 8,024,345 B2 * | 9/2011 | Colledge et al. | 707/741 |
| 8,321,901 B2 * | 11/2012 | Westbrook et al. | 725/97 |
| RE44,566 E * | 10/2013 | Goldberg et al. | 463/42 |
| 2001/0010059 A1 * | 7/2001 | Burman et al. | 709/224 |
| 2001/0049661 A1 | 12/2001 | Power et al. | |
| 2001/0049701 A1 * | 12/2001 | Howerton et al. | 707/513 |
| 2002/0002597 A1 | 1/2002 | Morrell, Jr. | |
| 2002/0010623 A1 * | 1/2002 | McCollom et al. | 705/14 |
| 2002/0161797 A1 * | 10/2002 | Gallo et al. | 707/500.1 |
| 2003/0028433 A1 | 2/2003 | Merriman et al. | |
| 2003/0088554 A1 | 5/2003 | Ryan et al. | |
| 2004/0068750 A1 | 4/2004 | Maa | |
| 2005/0097008 A1 | 5/2005 | Ehring et al. | 705/26 |
| 2005/0114208 A1 | 5/2005 | Arbuckle et al. | |
| 2005/0216335 A1 | 9/2005 | Fikes et al. | |
| 2006/0089880 A1 * | 4/2006 | Merriman et al. | 705/14 |
| 2006/0107217 A1 * | 5/2006 | Lu et al. | 715/733 |
| 2006/0112102 A1 * | 5/2006 | Shafron | 707/9 |
| 2006/0112341 A1 * | 5/2006 | Shafron | 715/733 |
| 2006/0129937 A1 * | 6/2006 | Shafron | 715/733 |
| 2007/0067331 A1 | 3/2007 | Schachter et al. | |
| 2007/0245246 A1 * | 10/2007 | Oren et al. | 715/744 |
| 2009/0164317 A1 * | 6/2009 | Glazer | 705/14 |
| 2009/0216639 A1 * | 8/2009 | Kapczynski et al. | 705/14 |
| 2009/0287567 A1 * | 11/2009 | Penberthy et al. | 705/14.43 |
| 2010/0023392 A1 | 1/2010 | Merriman et al. | |
| 2010/0045816 A1 * | 2/2010 | Rhoads | 348/222.1 |
| 2010/0269028 A1 * | 10/2010 | Othmer | 715/205 |
| 2011/0320441 A1 * | 12/2011 | Lee et al. | 707/723 |
| 2013/0042188 A1 * | 2/2013 | Dobronsky | 715/760 |
| 2013/0232099 A1 * | 9/2013 | Elbaz et al. | 706/46 |
| 2013/0305132 A1 * | 11/2013 | DiStefano, III | 715/205 |

OTHER PUBLICATIONS

Yen et al., Personalization of Information Access for Electronic Catalogs on the Web, Google 2002, pp. 20-40.*

Langheinrich et al., Unintrusive Customization Techniques for Web Advertising, Google 1999, pp. 1259-1272.*

Yuan et al., "The Relationship between Advertising and Content Provision on the Internet", European Journal of Marketing, 1998, vol. 32, No. 7/8, pp. 677-687.

Hofacker et al., "World Wide Web Banner Advertisement Copy Testing", European Journal of Marketing, 1998, vol. 32, No. 7/8, pp. 703-712.

Chen et al., "WebMate: A Person Agent for Browsing and Searching", ACM 1998, pp. 132-139.

Schwartz, Web Search Engine, Google, Journal of The American Society for Information Science, Sep. 1998, pp. 973-982.

* cited by examiner

STRUCTURED WEB ADVERTISING

CROSS-REFERENCE TO RELATED APPLICATION

This application is a Continuation of application Ser. No. 12/650,635, entitled "Structured Web Advertising," filed on 31 Dec. 2009, now abandoned, which is a Continuation of application Ser. No. 12/370,816, filed on 13 Feb. 2009, which is a Continuation of application Ser. No. 09/222,554, filed on 29 Dec. 1998, now issued as U.S. Pat. No. 7,493,553.

BACKGROUND

The present invention pertains to automatically selecting and linking information of different types, such as selecting and linking electronic advertisements to Web pages.

Information from different sources is frequently linked, through physical means (e.g. cut-and-paste) or using computers or similar means. Through this linking, two formerly unassociated units of information become associated, so that a user accessing one unit of information will be presented with both. For example, a user accessing a Web page will also access any electronic advertisements displayed on that page.

Often, one of these units of information will be predetermined (or "given"). Another unit of information will then be selected (or "chosen") to be linked to the given unit of information. The chosen information unit will often be selected from among a group of information units eligible for linking to the given information unit. This group of information units is referred to as "candidate information" because it includes units of information which are candidates to be selected for linking to the given piece of information. For example, a group of electronic advertisements would constitute candidate information if it was available for linking to a Web site (given information). The candidate information group may contain many units of candidate information, and there may be continual adding and deleting of units from the group.

The content (including characteristics) of the given information unit usually will determine which candidate information unit will be linked to the given information unit. The content of the given information is compared with the content (including characteristics) of the candidate information, and the best match is selected.

The field of advertising commonly presents occasions for linking of information. Advertisers seek to target their ads to consumers likely to consume their products. Linking the ads to information that these consumers desire enables the advertisers to target these consumers. For example, magazine publishers producing an issue focusing on a particular topic may attempt to attract advertisements from advertisers related to that topic, and may place the ads in the magazine near the relevant stories.

Publication of information on the World Wide Web is largely advertiser-funded. Operators of Web sites provide information on various pages of those sites which users access over the Internet. Web site operators place advertisements on their sites in exchange for payments from advertisers. These advertisements may include electronic displays of text and/or pictures, and may include links to Web sites operated by the advertiser.

Placing an advertisement on a Web page is an example of selecting a candidate information unit (advertisement) for a given information unit (Web page), and linking the two together. By matching the content of the given information unit to the candidate information units, the advertiser is able to target the users accessing the given information.

In the above-mentioned example, the given information is manually examined and compared to the candidate information in order to select one of the candidates to link to the given information. This laborious and time-intensive process is a limit on the linking of information. Furthermore, the candidate information group is usually not organized specifically for the purpose of selecting and linking the candidate information. Only the most general linkings are practical, such as, for example, linking ads to magazines with a focused audience, or a special issue devoted to a certain topic.

Web sites generally contain advertisements related to their general, but not specific content. Web sites including multiple Web pages may be divided into sections for certain topics. Advertisements related to those topics are allocated to the related sections, but it is not presently practical to allocate ads based on page-by-page content.

In addition to manual examination of given information, manual processing of the information, and linking to selected candidate information, as described above, other techniques have been used by Web advertisers to target their advertisements to certain users. Web search engine operators employ user-input data to present certain ads to users. When a user inputs search terms to retrieve links to Internet sites, the search engine compares the user-input information to Web site descriptors contained on the site (meta-text) to retrieve addresses of sites containing matches to the search terms. The search engine substantially simultaneously searches a database of advertisements for matches to the input search terms. The search engine then displays links to the retrieved Web sites along with selected advertisements.

Another method by which computer software can provide information to a user, based on user inputs, is a feature of some user-oriented software programs (e.g. word-processing programs). This feature continually compares user keystrokes and command selections to a database containing lists of inefficient keystrokes and command selections and corresponding user messages. When a match is found, the software will display a message to the user suggesting a more efficient way to perform the user's desired task. In this way, even though the user is not aware of which of the user inputs will trigger a message, valuable information will be sent to the user automatically.

SUMMARY

In one embodiment of the present invention, a method is provided for associating a chosen information unit with a given information unit comprising the steps of automatically determining a content data of the given information unit, and automatically selecting the chosen information unit as a function of the content data of the given information unit.

DETAILED DESCRIPTION

Figure 1:
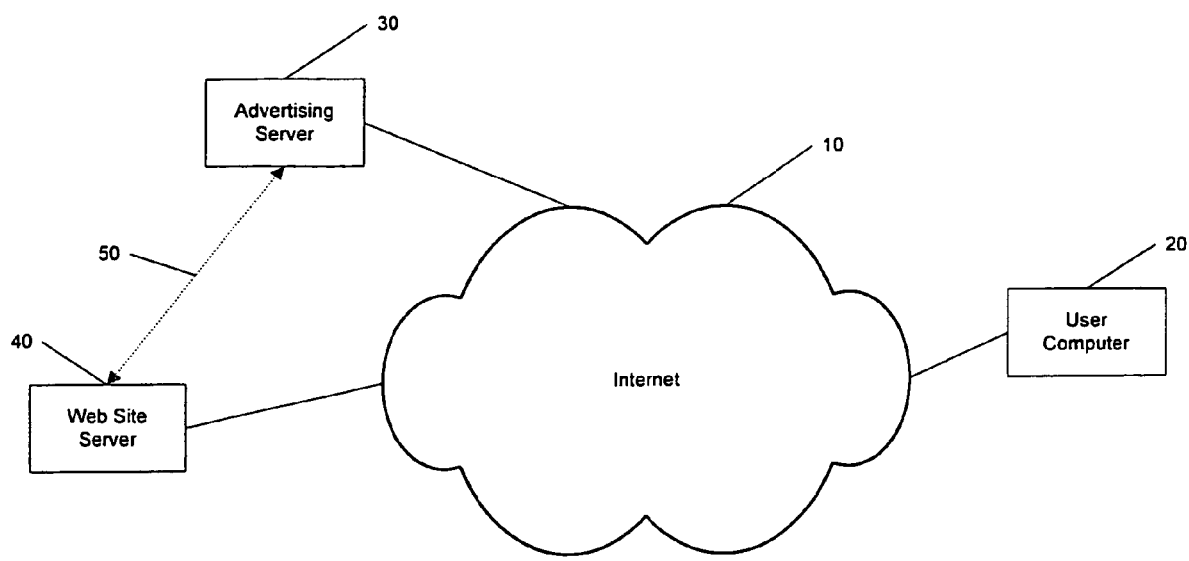
FIG. 1 is a block diagram of a computer system on which an embodiment of the present invention may be implemented.

Referring to FIG. 1, a block diagram of a system, such as a computer system, which is an example of a type of system on which an embodiment of the present invention may be implemented, is shown. A Web Site Server 40 may comprise, for example, a computer including a memory containing given information in the form of a web page which is accessible by a user computer 20 via the Internet 10. An advertising server 30 may comprise, for example, a computer including a memory containing candidate information in the form of advertisements available for linking to a web page. The candidate information resident in the advertising server may be organized, for example, as a look-up tree. The web site server 40 may be linked to the advertising server 30 via a direct connection 50. Alternatively, the web site server 40 may communicate with the advertising server 30 via the Internet, or the two may reside on the same computer/server. The invention is not limited in scope to a particular form of linking.

Figure 2:
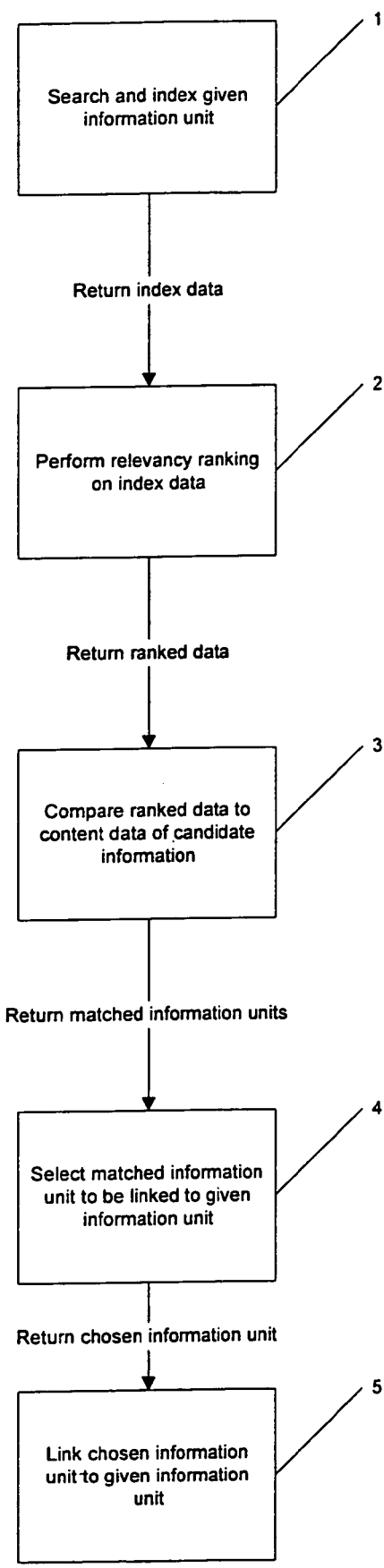
FIG. 2 is a flow diagram of a method according to an embodiment of the present invention.

Referring to FIG. 2, a general flow diagram of an embodiment of the present invention is shown. In this embodiment, a computer determines the content of the given information and provides a type of description or categorization of its contents. In 1, automatic searching and indexing of the given information is performed. This automatic searching and indexing may be performed by known methods such as with software products developed using the Verity Developer Kit (VDK) (Verity, Inc., 892 Ross Drive, Sunnyvale, Calif. 94809), which includes a core search engine and allows developers to build rules of evidence to classify documents and employ "fuzzy" concept-based searching (e.g. Intranet/Internet Spider), although the invention is not limited in scope in this respect. These program routines perform indexing of the information by customizable rules of evidence that link documents to concepts. The automatic searching and indexing programs return indexed data that reflects the contents and concepts contained in the given information unit.

In 2, an automatic relevancy ranking is performed on the indexed information to create the content data of the given information (e.g. key words). This relevancy ranking may be performed by known methods, such as checking to see how specific key words occur in a document or html (Hypertext Markup Language, Version 3.0) text, although, again, the invention is not limited in this respect. Relevancy ranking may be performed in a manner similar to the manner of any known Internet search engine (Alta Vista-www*altavista*com, Infoseek—www*infoseek*com, Yahoo—www.*yahoo*com), for example. It should be noted that periods have been replaced with asterisks to avoid inadvertent hyperlinks in this document. The relevancy ranking step determines how important the individual indexed terms are to the document, and how well they represent its content. The ranked content data that are output by this operation include words or phrases that provide a description of the contents of the given information. The relevancy ranking may be used to reduce the number of comparisons to be performed. For example, terms from a document or Web page with a ranking above a certain percentage (e.g. 90%) may be compared to the candidate information. In some embodiments, the relevancy ranking function may be performed during the same operation as the information indexing function, or by the same component of the system. For example, this relevancy ranking is also a capability of the VDK-developed products mentioned above.

In 3, the ranked content data from the given information are compared to the contents of the candidate information units. The candidate information units have been placed in categories and sub-categories (e.g. in a tree structure discussed below) according to their contents. By searching and comparing relevancy-ranked data to the categories of candidate information, matches of the relevancy-rankings to the categories are returned based on the contents of the candidate information units. By matching the categories and subcategories, the most relevant unit of candidate information may be selected.

Figure 3:
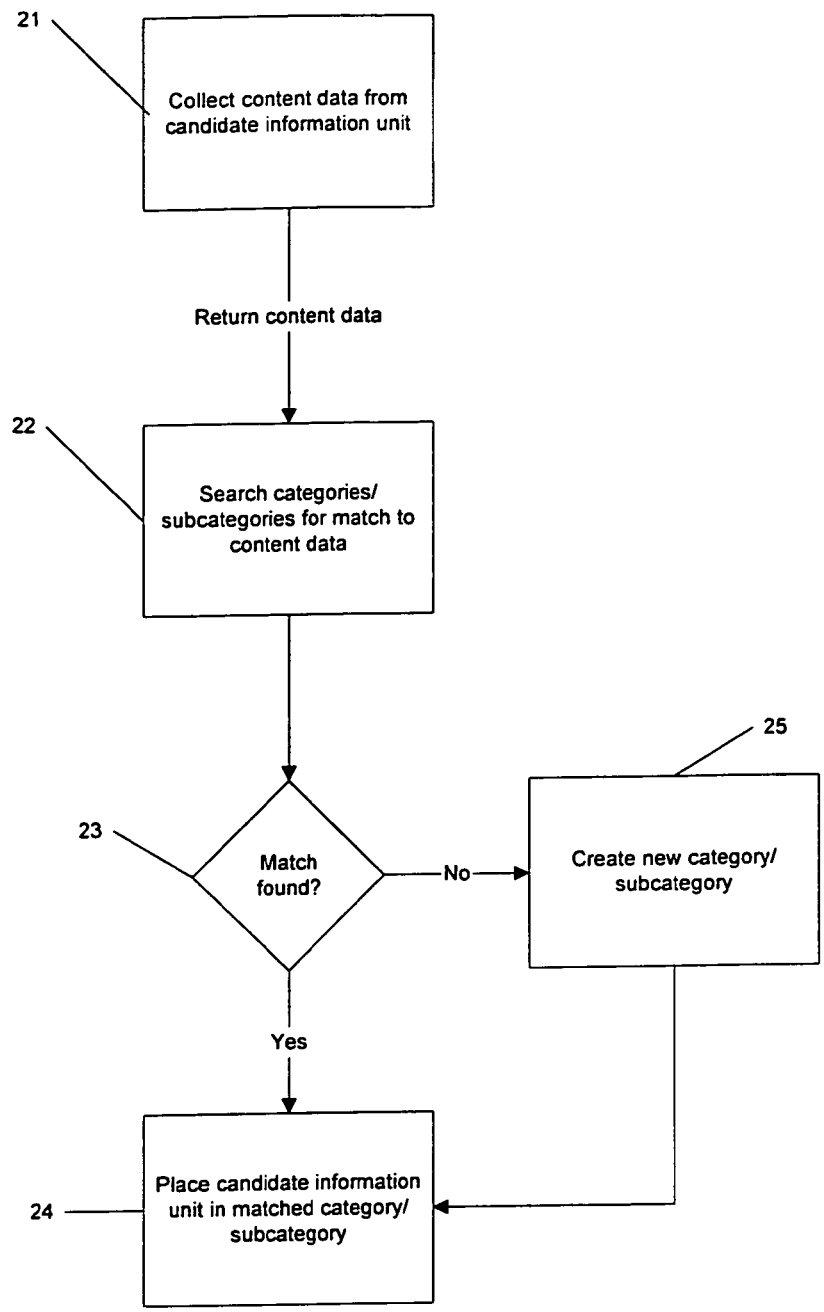
FIG. 3 is a flow diagram of a method for collecting and storing content data of candidate information according to an embodiment of the present invention.

FIG. 3 shows a process according to an embodiment of the invention by which the candidate information has been categorized. Content data of the candidate information units is gathered and the candidate information is placed in categories according to its content. In 21, content data about a unit of candidate information is collected. This can be done manually or by using a searching, indexing, and relevancy-ranking technique, such as described for the given information above, for example. Content data may include elements such as terms describing the content of the candidate information unit, terms describing subjects similar or parallel to the content information unit, the size of the candidate information unit, or the types of given information units with which it is desirable to associate the candidate information unit. For example, in the context of advertising, content data may be the type of information that could be used to link an advertisement to content (e.g. a Web page).

After 21 in which content data is collected either manually or automatically, in 22 categories and subcategories in an existing structure (e.g. a tree structure) are searched for matches to the content data of the candidate information units. In 23, it is determined whether a match to the content data was found. If a match was found, the candidate information unit is copied or moved into the relevant category or sub-category in 24. If no match was found, a new category or subcategory is created in 25. The candidate information unit is then copied or moved into this new category or subcategory in 24.

Figure 4:
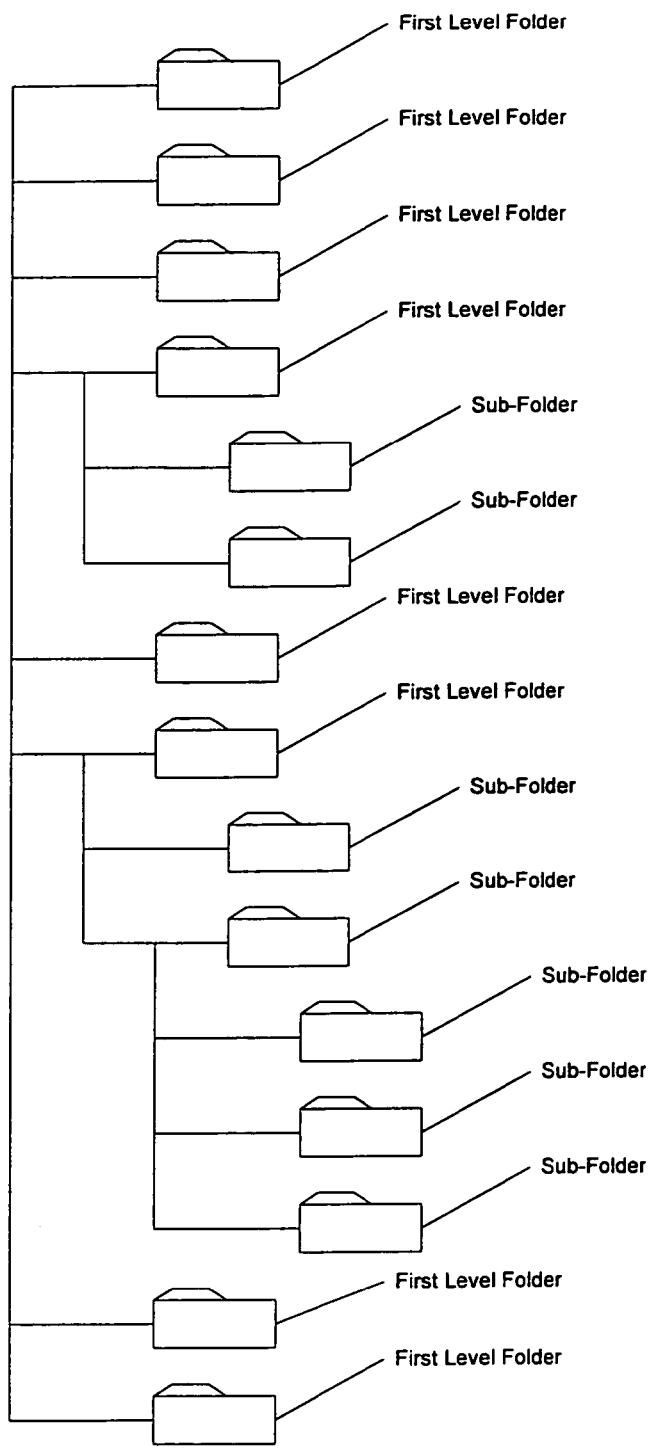
FIG. 4 is a structural diagram of the structure of a candidate information look-up tree according to an embodiment of the present invention.

In an embodiment of the invention, the categories and candidate information may be stored, for example, in an object-oriented database, although the invention is not limited in scope in this respect. This object-oriented database could include, for example, an information tree (an "explorer" or "look-up" tree), the structure of which is shown in FIG. 4. The look-up tree may reside on a computer such as the advertising server 30, although the invention is not limited in scope in this respect. In the embodiment shown in FIG. 4, a look-up tree is shown as a series of folders and sub-folders. Folders and sub-folders may comprise, for example, files, directories, or any other computer data structure for organizing information. The most general folders are shown as "First Level Folders" in FIG. 4. These are the first folders searched at the beginning of a searching of the tree. When a matching folder is found, the sub-folder is examined, and so on until the lowest level is reached.

There are many other possible methods, however, of creating and storing the content data of a candidate information unit within the scope of the present invention. This may be done through an automatic relevancy ranking similar to the type used for the given information, or the content data may be manually determined and associated with the candidate information by, for example, linking or attaching a list of key words or descriptions to the candidate information.

Returning to FIG. 2, in 3, the ranked content data of the given information is compared to the content data of the candidate information units to determine which candidate information unit best matches the given information unit (i.e., which candidate information unit is most relevant (e.g., contains matching terms) to the highest-ranked terms of the given information unit). In the example of Web advertising, the ranked content data of the Web page is compared to the content data of the advertisements to determine which advertisement is the best match (e.g., having terms matching the highest-ranked content data; having the greatest number of matching terms, or by some other method of determining relevancy) to be displayed on the Web page. The candidate information units having content data matching the relevancy ranked data are returned as "matches." These "matched information units" are a subset of the candidate information units.

In the event that more matches are returned than units of candidate information sought for linking, the proper number of information units may be selected by any of a number of methods in 4. For example, a round-robin type allocation scheme may be used to rotate the units of matched information that will be selected. Alternatively, the units could be ranked and selected based on the closeness of the match, the source of the information, or the content of the information. The units could also be randomly selected. The unit (or units) that is ultimately selected is referred to as a "chosen information unit" and is returned in 4. For example, in the context of Web advertising, if several advertisements matched equally well to a Web page in 3, but the Web page has room for only one advertisement, then one of the matched advertisements will be selected from the group, as described above.

In 5, the chosen information unit is linked to the given information unit. This can be accomplished by any one of a number of methods such as creating a message indicating that the information units should be displayed together, by combining the information units, or by establishing an electronic link (e.g. a pointer) from one to the other. In the example of Web advertising, this is accomplished by copying the software comprising the advertisement into the software comprising the Web page. The software managing the advertisements may keep track of the ads chosen and displayed, and may register charges to the advertisers accordingly, in one embodiment.

Figure 5:
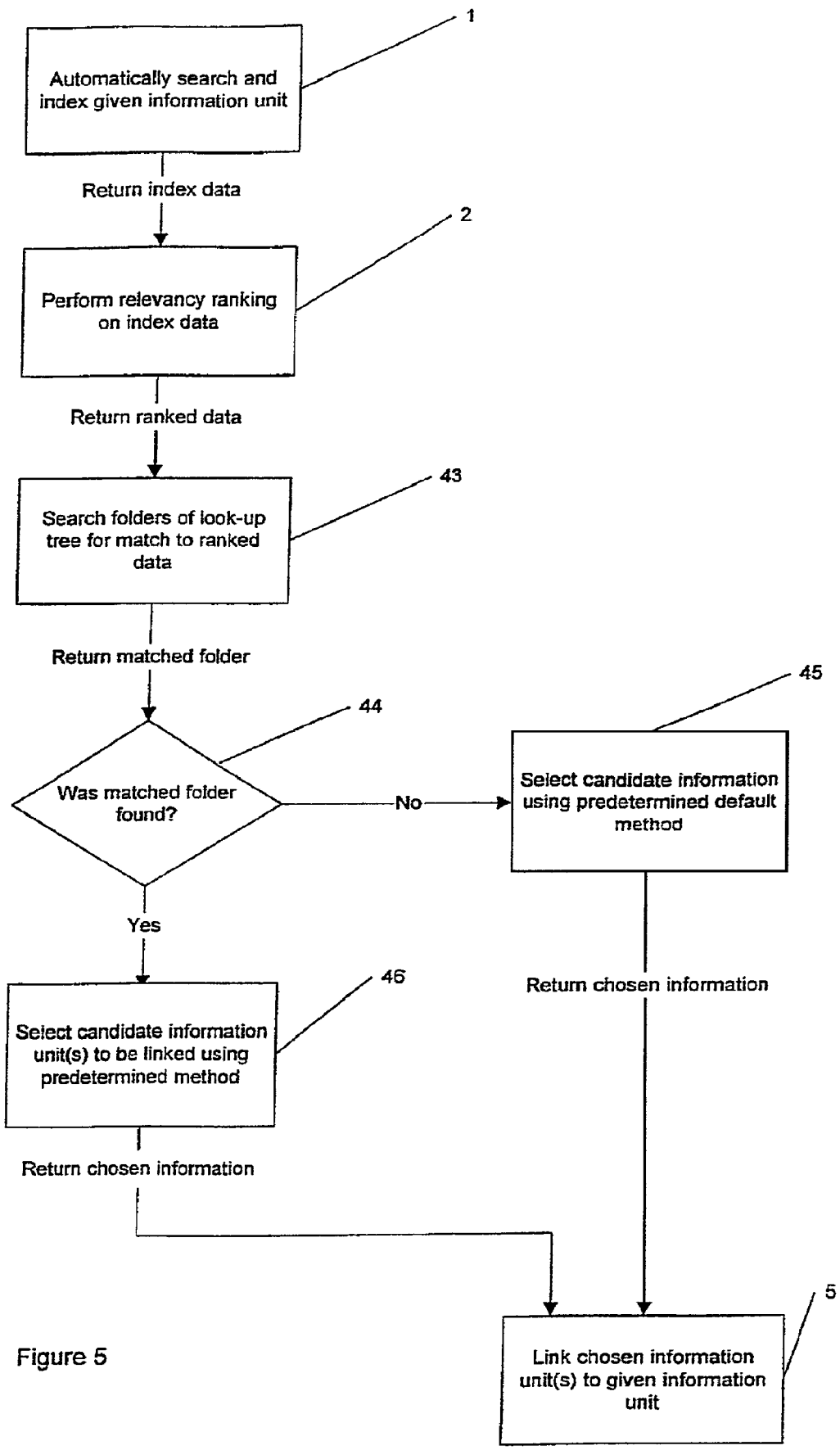
FIG. 5 is a flow diagram of a method according to an embodiment of the present invention.

FIG. 5 shows an embodiment of the invention shown in FIG. 2, in which a look-up tree is employed as the method for organizing the candidate information. The basic structure of a look-up tree is shown in FIG. 4. Each unit of candidate information is placed in a folder contained in the tree. The units of candidate information may be placed in the look-up tree manually or automatically using, for example, a relevancy-ranking process.

In the embodiment shown in FIGS. 5, 1 and 2 are performed as in the embodiment shown in FIG. 2. An automatic searching and indexing is performed on the given information unit (e.g. a Web page) and the indexed data is ranked according to a relevancy ranking algorithm. In 43, the results of this relevancy ranking are compared to the names of the folders in the candidate information look-up tree. It is to be understood that the term "folder" may refer to both folders and sub-folders, as labeled in the figures. The folders may also contain key words in addition to folder names that can be used in comparing the folders to the ranked data. The entire tree is searched, the folders and sub-folders (e.g. folder names and key words) are compared to the ranked data, and the folder that matches the most relevant data is selected. 43 returns the matched folder (e.g. with a pointer to the matched folder) if one is found.

In 44, it is determined whether a matched folder was found. If no match was found, candidate information is selected using some predetermined default method in 45. This method may not match the candidate information to the given information according to relevancy ranking results. For example, candidate information might be selected from a default queue, or by a round-robin scheme, or randomly from a collection of candidate information units. In the context of Web advertising, default advertisements are stored in a default ad queue and these advertisements are selected when no match is found. 45 returns chosen information, selected with the default method. This chosen information is linked to the given information unit in 5, as described for the embodiment shown in FIG. 2.

If 44 indicates that a matched folder was found, candidate information units from that folder are selected for linking to the given information unit in 46. This is performed by some predetermined method such as, for example, by a relevancy search, a round-robin arbitration, a random selection, or other such technique performed on the folder contents. Alternatively, if the folder does not contain more candidate information units than are used for linking, then the entire folder contents may be chosen. After the chosen information has been selected from the matched folder, the chosen information is linked to the given information unit in 5, as described for the embodiment shown in FIG. 2.

Figure 6:
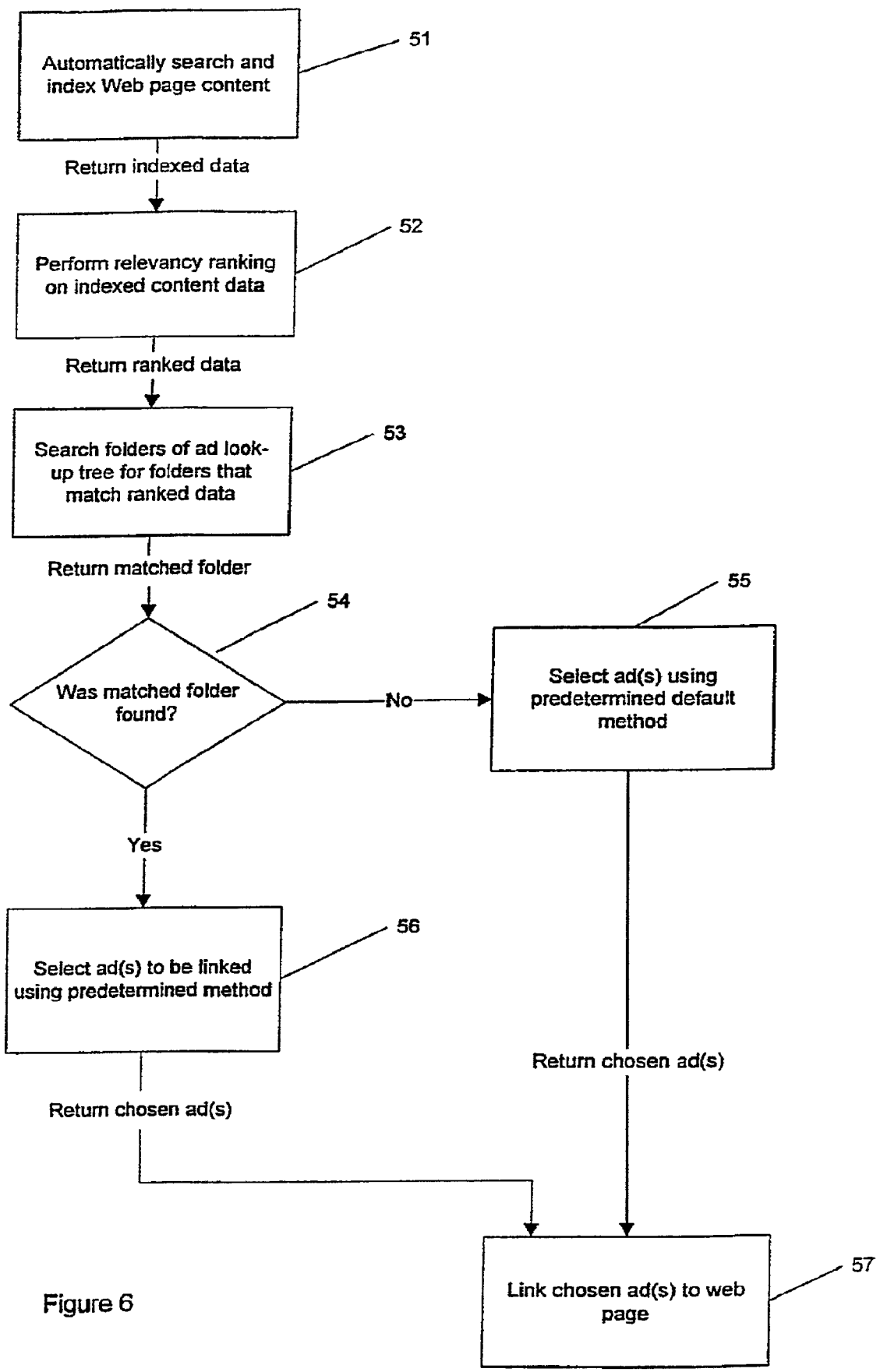
FIG. 6 is a flow diagram of a method according to an embodiment of the present invention designed to select ads for linking to Web pages.

FIG. 6 shows an embodiment of the present invention adapted for use in managing advertising on the Internet, specifically, on the World Wide Web. Advertising may be a primary source of revenue to those who provide information on the World Wide Web. Information is posted on the World Wide Web in the form of Web sites that comprise pages of html text along with graphics (Web pages). Advertisements are posted on Web pages accessed by Web users so that the users read the advertisements in the process of gaining information from the Web. Advertisements often also provide links to other html pages maintained by the advertisers.

In the embodiment shown in FIG. 6, the given information includes a Web page. A Web page includes computer software residing on a server (such as the web site server 40), the execution of which displays text, graphics, and links to other pages to users who access the page over the Internet. In the embodiment shown in FIG. 6, the candidate information includes advertisements residing on the advertising server 30, and intended for display on Web pages. These advertisements also comprise software for the display of text, graphics, and links to other Web pages. When a user computer 20 accesses a Web page, an advertisement is chosen from the group of candidate advertisements, and is displayed on the Web page. This is accomplished by copying the software comprising the advertisement into the software comprising the Web page, for example, by transferring a file containing the advertisement to the user computer 20. The software managing the advertisements may keep track of the ads chosen and displayed, and may register charges to the advertisers accordingly.

In 51, the content of the web page seeking an advertisement is indexed according to the methods outlined above for given information in general. This indexing may be performed, for example, by a software module residing on the web site server 40, or on the advertising server 30 (in which case the software accesses the web page data via the connection 50 or the Internet 10. For example, if a web page comprises a news article discussing the usefulness of spreadsheet software programs for data management, the words making up this article may be indexed in 51. 51 returns indexed web page data (for example, to a software module that performs a relevancy ranking according to methods outlined above). The relevancy-ranking software module may reside, for example, on the web site server 40 or the advertising server 30. In 52, a relevancy ranking may be performed, according to the methods described above. In the example of a data management news article, the relevancy ranked data could comprise words representing the key concepts and subjects of the article. In this case, the ranked data could reflect that the article is about computers, software, data management, and spreadsheet programs. These concepts, returned by 52, may be used to determine which ads will best match (i.e., are most relevant to) the subject of the web page. In 53, the ranked web page data is used to search the folders of the ad look-up tree. The ad look-up tree resides, for example, on the advertising server 30, and the ranked web page data is passed to a software module for searching the ad look-up tree. The ranked data is compared to, e.g. the folder names and key words that describe the contents of the folders and sub-folders to determine which ad folder best matches the web page content.

The advertisements may be organized in an ad look-up tree of a structure similar to that shown in FIG. 4. The ad look-up tree may include folders and sub-folders implemented in software and computer memory. Each folder and sub-folder may itself contain advertisements and/or sub-folders. Each advertisement in the tree may be contained in at least one folder or sub-folder. In addition to containing advertisements and sub-folders, each folder may contain labeling information corresponding to content data of the ads contained within the folder (e.g. key words).

Figure 7:
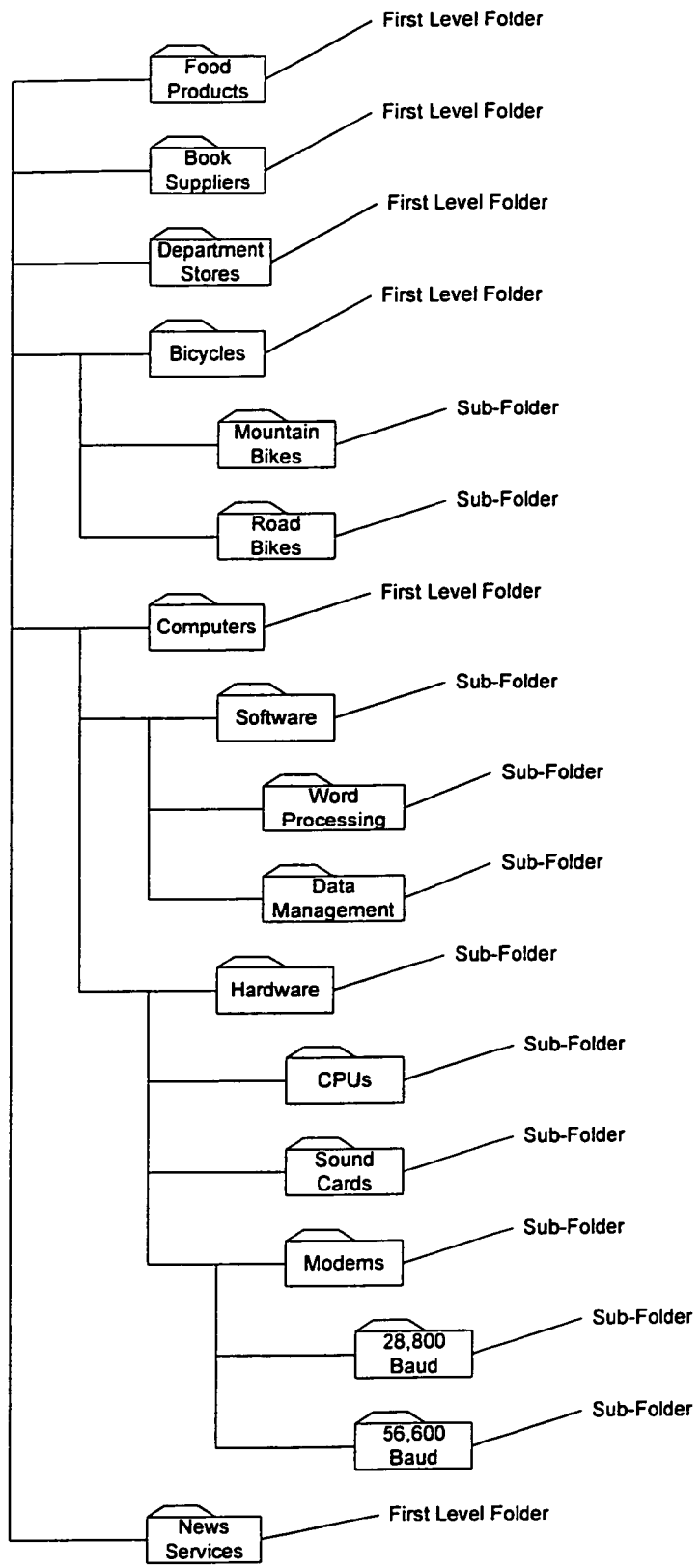
FIG. 7 is a structural diagram of the structure of a candidate information look-up tree with example folder labels according to an embodiment of the present invention.

An ad look-up tree with folder labeling information is shown in FIG. 7. The more general ad categories are shown at the first level of the tree (e.g. food products, computers), and the categories become more specific at each subsequent level (e.g. software, hardware at the next level, then sound cards and modems at the next level). The ads may be placed in the folders according to the content data of the ads. In one embodiment of the invention, the folder labels of the look-up tree are determined by the content of the ads.

When the content data is determined from the ad, it may be determined whether a proper folder for the ad already exists. If there is a proper folder, the ad is placed in that folder. If there is no proper folder, or if there is content data that is more specific than the matched folder, a new sub-folder may be created based on the content data. The ad may then be placed in the newly-created folder. In another embodiment of the invention, the folders may be created independently of the content data of the advertisements. The ads may be placed in the folders and sub-folders based on matching the content of the ads to the pre-existing labels of the folders and sub-folders, but new folders and subfolders may not be automatically created according to the content data.

Figure 8:
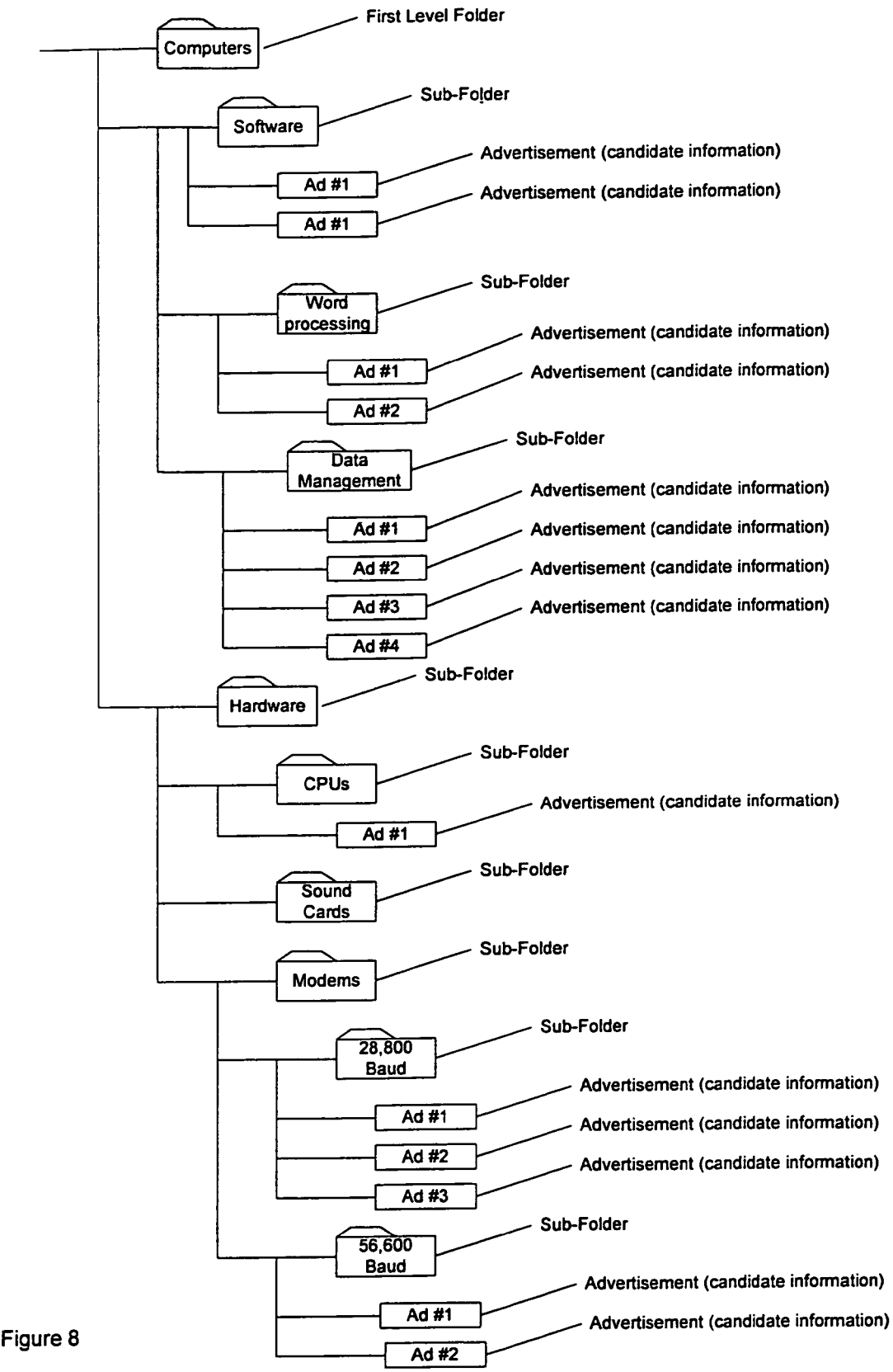
FIG. 8 is a structural diagram of the structure of a candidate information look-up tree according to an embodiment of the present invention with example folder labels and example folder contents illustrated.

FIG. 8 is an illustration of the contents of the folder labeled "computers" from FIG. 7. The sub-folders within the "computers" folder are shown, along with contents of the folders (advertisements). For example, the "computers" folder contains a "software" sub-folder and a "hardware" sub-folder. The "software" sub-folder contains two advertisements (e.g. general advertisements for software companies or distributors) and two sub-folders. The "software" sub-folders are labeled "word processing" and "data management." These sub-folders also contain advertisements which may be, for example, for word processing programs and spreadsheet programs respectively.

In FIG. 6, 53, the folders of the ad look-up tree, an example of which is shown in FIGS. 7 and 8, are searched to find the folder that best matches the ranked data. It is to be understood that the term "folder" may refer to both folders and sub-folders, as labeled in the figures. The ranked data of the web page may be compared to, for example, the folder labels and key words contained in the folders. In the case of ranked data from an article about data management and spreadsheet programs, these concepts may be compared to the folder names shown in FIGS. 7 and 8. Matching the concepts from the web page, the data management folder may be selected as the best match in 53.

In 54, it is determined whether a matched folder was found. If no matched folder was found in the ad look-up tree, an ad may be selected using a predetermined default method, as described for FIG. 5. The chosen ad may then be linked to the web page in 57 by, for example, sending a file containing the advertisement to the web site server for placement within the files comprising the web page, or by sending the file to the user computer directly for insertion into the web page. If, in 54, it is determined that a matched folder was found, an ad is selected from the matched folder in 56. For example, when it is determined that the data management folder is the best match, one of the four ads in that folder may be selected to be linked to the web page containing an article about using spreadsheet software programs for data management. The four ads in the data management folder might comprise, for example, advertisements for different software products or companies relating to data management. The selection of the ad to be linked to the web page could be done by random choice, by selecting the ad currently designated by a round-robin scheme, or by comparing the ranked data to the ad content. This could be done, for example, by comparing the ranked data to key words stored in the ad. In this manner an ad for a spreadsheet program might be selected rather than an ad for a database program, because the article was about the use of spreadsheet programs. Whatever the selection method, the chosen ad (e.g. ad #1) is returned (e.g. to the web site server) in 56. In 57, the chosen ad is linked to the web page, as described above. For example, ad #1 for a spreadsheet program may be displayed at the top of the article about use of spreadsheet software programs for data management. In this way, the ad may be specifically targeted to an interested user.

By automating the process of indexing and ranking the content of the given information, the costs of performing such a ranking may drop dramatically. This allows for a much more efficient and detailed selecting and linking of candidate information to given information. When there is a very large number of given information units and candidate information units, very detailed targeting and linking may be performed where only very general targeting and linking was previously possible, if at all. In the context of Web advertising, this may be especially true. As the number of Web sites offering advertising increases, advertising may become a commodity product. This may push ad prices down and shrink profit margins for sites supported by advertising. At the same time, many sites offering advertising space are becoming increasingly large and complex, with more and more pages in a single site. In addition, some Web sites (e.g. news services) have Web pages with content that is changing on an ongoing basis. This makes detailed targeting and linking of ads even harder. Each page of a site, however, constitutes a unit of given information, and the present invention can be adapted to address these problems.

Presently, only the most general targeting is done. For example, news services on the Internet often have a portion of their sites devoted to sports news and another devoted to financial news. Financial-oriented ads (e.g. broker services, mutual funds) may appear on the financial section, and sports-oriented ads in the sports section. Each news story on the site, however, may be a separate page, and it is desirable to link ads to each story which specifically relate to that story. The present invention may be employed to perform this function inexpensively and efficiently. The present invention could be used, for example, to perform indexing and ranking of the content of each story posted to a news service Web site, to compare the related content to an ad look-up tree, and to place ads appropriate to each story on the page containing that story. Because users accessing the stories may be interested in the topics those stories present, the ads may be targeted to users with those same interests. This may allow the Web site operator employing such a system to offer advertisers a premium service of very focused advertising, increasing the value of the site and allowing the Web site provider higher profit margins.

In addition to the above-described aspects of the invention, a system may be included for verifying that a selected advertisement (chosen information unit) is appropriate for the web page (given information unit). For example, this could prevent an advertisement for ice cream from being linked to a news article describing the health risks of eating too much ice cream, even though the subject of both may be ice cream. This may be done, for example, by the web page specifying types of ads it is not interested in, and checking selected advertisements to determine if they are of this type. Alternatively, this could be a function of the look-up tree, which could further examine the total content of the web page (e.g. more of the ranked results) to determine if the web page is suitable for the advertisement. If the page is not suitable, an alternative ad from the same folder may be selected, or an ad may be selected using a predetermined default method.

In another embodiment of the present invention, personalized information about the Web site user may be used in selecting the candidate information unit (e.g. advertisement) to be linked to the given information unit (e.g. Web site page). This user information may be used in conjunction with, or instead of, the content of the Web page to select the advertisement. The user information may include information directly input by the user (e.g. search terms, survey answers), or information indirectly input by the user (e.g. typing speed, history of selected links, length of time connected to the Internet).

In another embodiment of the present invention, in which information about the user's computer system may be used to determine which candidate information unit (e.g. an advertisement) is selected. This user system information can be used in conjunction with, or instead of, the content of the Web page to select the advertisement. The user system information may be obtained across the user's Internet connection. For example, the user's "Start Menu" (a feature of the Microsoft Windows® 95 operating system) may be accessed and queried to determine the software the user has installed on his computer. Alternatively, the user system information may be obtained programmatically by accessing the operating system (e.g. the operating system's registry or "plug and play" data). "Plug and play" is also a feature of the Microsoft Windows® 95 operating system and contains data relating to the hardware components installed on the user's computer.

By accessing these components over the Internet, software may be used to query the user's computer to determine what hardware and software components the user has. For example, the software may determine that the user has a 28,800 baud modem (modulator/demodulator). This information may be used, for example, to link only ads for modems faster than 28,800 to Web pages the user accesses.

An embodiment of the present invention may employ user system data to select advertisements for linking to a web page. A software query message may be sent to the user computer system over the Internet connection of the user's computer system. The query software runs a diagnostic program on the user's computer system to determine the nature of the system and its components. This diagnostic may be performed, for example, by accessing system files stored on the user's computer, by running a diagnostic program already located on the user's computer, by communicating with the user's operating system, or by downloading diagnostic software onto the user's computer. The query may also determine which software programs are loaded on the user system, and which are currently running.

The query software returns a reply message containing the user system data retrieved from the diagnostic session, and sends the reply message over the user's Internet connection. The user system data is used to search the ad look-up tree. This search may be performed in a similar manner to the search performed using the ranked data described above (e.g. 53, FIG. 6), except that the user system data may be used in place of the ranked data (or in some embodiments, as a supplement to it). Steps may be performed in a similar manner to 54-57 of FIG. 6, except that the user system data may be used in place of the ranked content data.

In addition to the embodiments of the invention outlined above, it is possible to employ the techniques of different embodiments together. For example, in another embodiment of the present invention, the ranked content data of the given information may be used to search the look-up tree containing the candidate information, but the candidate information unit is actually selected using user input data or user system data (determined as outlined above). An example of this embodiment is shown in FIG. 6, where the "predetermined method" of 55 may employ user input data or user system data to select the chosen ad from the candidates in the folder.

Although an embodiment is specifically illustrated and described herein, it will be appreciated that modifications and variations of the present invention are covered by the above teachings and within the purview of the appended claims without departing from the spirit and intended scope of the invention.

What is claimed is:

1. An advertising method comprising:
   automatically determining content data of a web page by searching the web page, indexing the web page to produce indexed data, and performing a relevancy ranking on the indexed data; and
   automatically selecting an advertisement for linking said advertisement to the web page by automatically comparing the ranked indexed data of the web page to content data of a plurality of advertisements and selecting an advertisement based on the comparison for linking to the web page.

2. The method of claim 1, wherein personalized information about the user comprises information directly input by the user.

3. The method of claim 2, wherein information directly input by the user comprises search terms and survey answers.

4. The method of claim 1, wherein personalized information about the user comprises information indirectly input by the user.

5. The method of claim 4, wherein information indirectly input by the user comprises history of selected links and length of time connected to a network.

6. The method of claim 1, wherein the information obtained from the user's computing device is used in conjunction with the content of the web page to select an advertisement.

7. The method of claim 1, wherein the information obtained from the user's computing device is used instead of the content of the web page to select an advertisement.

8. The method of claim 1, wherein the information obtained from the content of the web page is used instead of the information obtained from the user's computing device to select an advertisement.

9. The method of claim 1, wherein the information obtained from the user's computing device further comprises:
    accessing the user's computing device via a user Internet connection; and
    querying the user's computing device to determine user computing device data.

10. The method of claim 9, wherein querying the user's computing device comprises determining software programs loaded on the user's computing device, including software programs currently running on the user's computing device.

11. The method of claim 9, wherein querying the user's computing device comprises accessing system files stored on the user's computing device.

12. The method of claim 1, wherein automatically determining the content data of the web page comprises:
    selecting a keyword;
    counting a number of occurrences of the keyword; and
    ranking the keyword according to the number of occurrences of the keyword.

13. An article comprising a storage medium having a plurality of machine accessible instructions, wherein when the instructions are executed by a processor, the instructions provide for determining personalized information about a user, including information obtained from the user's computing device;
    determining content data of a web page by searching the web page, indexing the web page to produce indexed data, and performing a relevancy ranking on the indexed data; and
    selecting an advertisement, based on the personalized information of the user and/or the content data of the web page, for linking said advertisement to the web page by automatically comparing the ranked indexed data of the web page to content data of a plurality of advertisements and selecting an advertisement based on the comparison for linking to the web page.

14. The article of claim 13, wherein personalized information about the user comprises information directly input by the user.

15. The article of claim 14, wherein information directly input by the user comprises search terms and survey answers.

16. The article of claim 13, wherein personalized information about the user comprises information indirectly input by the user.

17. The article of claim 16, wherein information indirectly input by the user comprises history of selected links and length of time connected to a network.

18. The article of claim 13, wherein the information obtained from the user's computing device is used in conjunction with the content of the web page to select an advertisement.

19. The article of claim 13, wherein the information obtained from the user's computing device is used instead of the content of the web page to select an advertisement.

20. The article of claim 13, wherein the information obtained from the content of the web page is used instead of the information obtained from the user's computing device to select an advertisement.

21. The article of claim 13, wherein instructions for obtaining the information from the user's computing device comprises instructions for:
    accessing the user's computing device via a user Internet connection; and
    querying the user's computing device to determine user computing device data.

22. The article of claim 21, wherein instructions for querying the user's computing device comprises instructions for determining software programs loaded on the user's computing device, including software programs currently running on the user's computing device.

23. The article of claim 21, wherein instructions for querying the user's computing device comprises instructions for accessing system files stored on the user's computing device.

24. The article of claim 13, wherein instructions for automatically determining the content data of the web page comprises instructions for:
    selecting a keyword;
    counting a number of occurrences of the keyword; and
    ranking the keyword according to the number of occurrences of the keyword.

25. A computing system comprising:
    a server;
    a web page;
    a plurality of advertisements coupled to the server, the server adapted to determine personalized information about a user, including information obtained by electronically analyzing the user's computing device;
    automatically determine content data of a web page by searching the web page, indexing the web page to produce indexed data, and performing a relevancy ranking on the indexed data; and
    select an advertisement from the plurality of advertisements, based on the personalized information of the user and/or the content data of the web page, for linking said advertisement to the web page by automatically comparing the ranked indexed data of the web page to content data of a plurality of advertisements and selecting an advertisement based on the comparison for linking to the web page.

26. The computing system of claim 25, wherein the server adapted to determine personalized information about the user further comprises the server adapted to:
    access the user's computing device via a user Internet connection; and
    query the user's computing device to determine user computing device data.

27. The computing system of claim 25, wherein the server adapted to query the user's computing device further comprises the server adapted to determine software programs loaded on the user's computing device, including software programs currently running on the user's computing device.

28. The computing system of claim 25, wherein the server adapted to query the user's computing device further comprises the server adapted to access system files stored on the user's computing device.

* * * * *